United States Patent [19]
Lore

[11] 3,863,383
[45] Feb. 4, 1975

[54] BAIT SAVER
[76] Inventor: Gregory Lore, 2775 21st St., Sacramento, Calif. 95818
[22] Filed: Jan. 29, 1974
[21] Appl. No.: 437,642

[52] U.S. Cl............... 43/44.8, 43/44.2, 43/44.6, 43/44.8, 43/41, 43/43.6
[51] Int. Cl............................................ A01k 83/06
[58] Field of Search ........... 43/44.2, 44.6, 44.8, 41, 43/43.6

[56] References Cited
UNITED STATES PATENTS
| | | | |
|---|---|---|---|
| 2,234,516 | 3/1941 | Clark | 43/44.2 |
| 2,540,276 | 2/1951 | Moler | 43/44.2 |
| 3,163,958 | 1/1965 | Quinn | 43/44.8 |

Primary Examiner—Louis G. Mancene
Attorney, Agent, or Firm—Blair & Brown

[57] ABSTRACT

A bait saver is provided that includes a pair of washers that are mounted on the shank of a fish hook. A leader is connected to the fish hook, and the bait that is mounted on the fish hook has a portion retained between the washers.

6 Claims, 5 Drawing Figures

PATENTED FEB 4 1975 3,863,383

BAIT SAVER

BACKGROUND OF THE INVENTION

Field of the Invention

The present invention relates to fishing accessories, and more particularly to a bait saver for a fish hook.

SUMMARY OF THE INVENTION

A bait saver is provided that consist of a pair of washers that are mounted on the shank portion of a fish hook. A leader is connected to the shank in such a manner that a portion of the bait is retained between the washers. The bait saver can be used for different types of bait such as worms, minnows and the like.

The primary object of the invention is to provide a device that will help keep bait alive and in addition the present invention will prevent the fish from stealing the bail while grabbing the hook.

Still another object of the present invention is to provide a bait saver that is constructed so that the worms will not be cut by the leader line, and wherein the device can be used for different types of hooks such as very small hooks, as well as being convenient to use for deep sea fishing.

Other objects and advantages will become apparent in the following specification when considered in the light of the attached drawings.

DESCRIPTION OF THE PREFERRED EMBODIMENT

Figure 1:
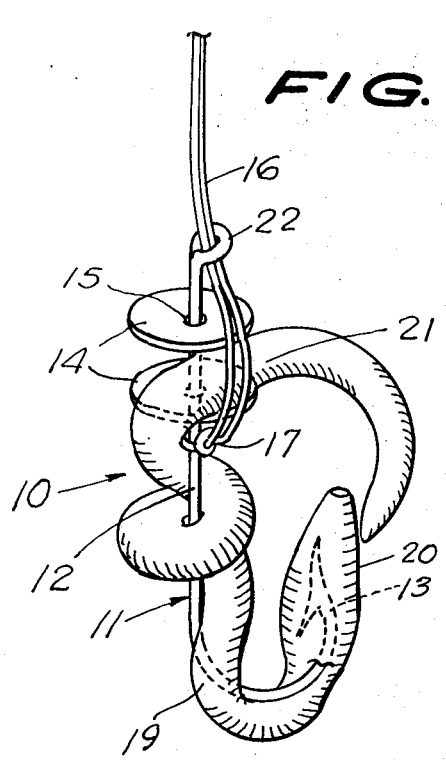
FIG. 1 is a perspective view of the bait saver showing a worm there attached.

Referring now to the drawings in detail, the numeral 10 indicates the bait saver of the present invention that includes a conventional fish hook 11 that has a shank 12 as well as a barbed tip 13, FIG. 1. The numeral 14 indicates each of a pair spaced parallel circular washers that are moveably mounted on the shank 12 of the fish hook 11 as shown in the drawings. Each of the washers 14 have central aperture 15 therein for the projection therethrough of the shank 12. The fish hook 11 includes the usual eye 22 on the opposite end from the barbed tip 13.

As shown in the drawings a leader 16 extends through the eye 22, and the leader 16 is connected as at 17 to the fish hook shank 12. A portion of the leader 16 engages and extends over the outer periphery of the washers 14 to provide a looped portion.

Figure 2:
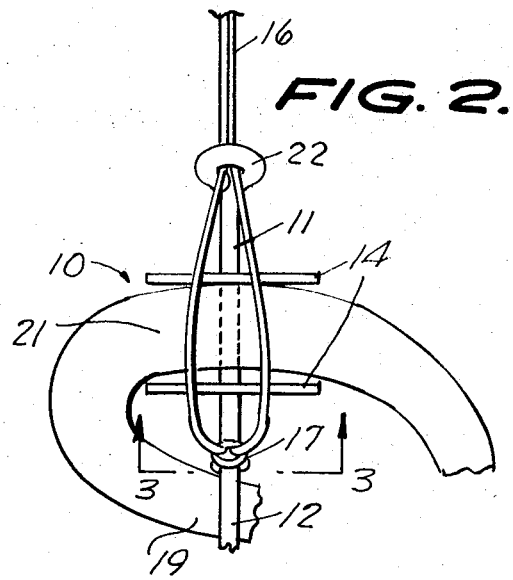
FIG. 2 is an enlarged fragmentary elevational view illustrating the present invention.
Figure 3:
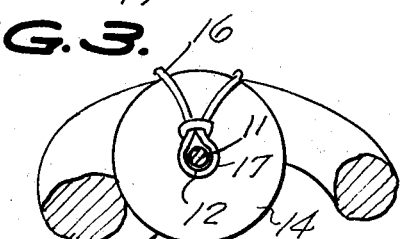
FIG. 3 is a sectional view taken on the line 3—3 of FIG. 2.

As shown in FIGS. 1, 2, and 3 the numeral 19 indicates bait such as a worm that has an end 20 engaging the tip 13, and the tail portion 21 of the worm is adapted to be clamped between the pair of washers 14 and below the looped portion of the leader 16.

Figure 5:
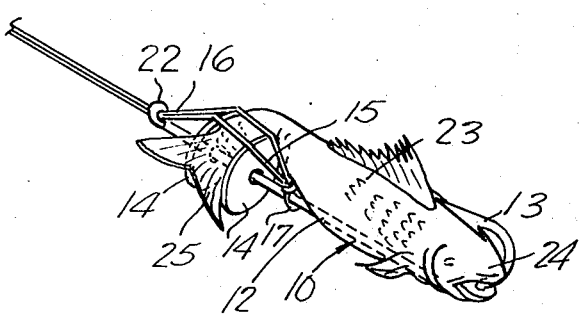
FIG. 5 is a perspective view showing a different type of bait on the device.

Referring now to FIG. 5 of the drawings a different type of bait such as a minnow 23 is shown being used on the bait saver, and the minnow 23 is adapted to have it's head portion 24 engaging the hook 13, while the tail 25 thereof is clamped between the pair of washers 14 and below the loop portion of the leader line.

From the foregoing, it will be seen that there has been provided a bait saver, and in use with the parts arranged as shown in the drawings, bait such as the worm 19 is adapted to be mounted on the device so that the head portion 20 of the worm 19 is arranged in engagement with the barbed tip 13. The tail portion 21 is adapted to be clamped between the pair of washers 14 and the tail portion 21 extends below the looped portion of the leader 16. This construction will prevent fish from stealing the bait without grabbing the hook. As shown in FIG. 5 instead of using the worm 19, the minnow 23 can be used thereon so that the head 24 of the minnow engages the hook tip 13 while the tail portion 25 is clamped between the pair of washers 14 below the looped portion of the leader.

Figure 4:
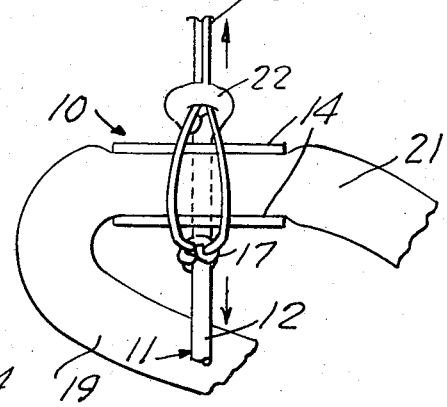
FIG. 4 is a view generally similar to FIG. 2 but showing the parts in a different position.

It will be noted that the pair of washers have central apertures 15 therein so that the washers 14 are moveably mounted on the shank portion 12 whereby the parts can be arranged in a position such as that shown in FIG. 2 or in the position such as that shown in FIG. 4.

The parts can be made of any suitable material and in different shapes and sizes as desired or required.

When using the device the bait such as the worm 19 is placed on the fish hook in a conventional manner, and then by pushing the line towards the point or tip of the hook, it causes the two washers 14 to spread apart. The tail 21 of the worm is then placed in the loop of the line and between the two washers. By pulling on the line, the two washers are drawn toward each other which secures the tail of the worm therebetween.

Also, for deep sea fishing or wherever live minnows are used, the hook portion can be placed in the minnows head or mouth and the tail secured just as for the worm.

This construction not only keeps the bait alive, but prevents the fish from stealing the bait without grabbing the hook. The washers can be made of any suitable material for example a relatively thin neoprene and or rubber type of material can be used since it will serve to hold better and afford less slippage.

In the present invention the leader line does not run through the holes 15 of the washers 14 since this would be disadvantage in as much as it would cut the worm in half. Also the present invention can be used for various small hooks such as are used for trout fishing and the like. Further, with the present invention the leader does not actually secure the bait and hence will not cut the bait because the bait is secured between the washers and the leader is looped outside of the washers. The bait saver and hook up can be used on the smallest trout fishing hook as well as for deep sea fishing. The head of the minnow may be attached to the hook and the tail portion can be secured between the washers to make it impossible to escape or be cut in half regardless of size or shape. An important aspect of the present invention is the placement of the leader to help retain the bait of any type in it's proper position.

Having thus described the preferred embodiment of the invention it should be understood that numerous structural modifications and adaptations may be resorted without departing from the spirit of the invention. What is claimed is:

1. In a bait saver, a fish hook includes a shank having an eye on one end thereof, a tip on the other end of the shank, a pair of spaced apart washers moveably mounted on said shank and having centrally disposed apertures therein for the projection therethrough of the fish hook shank, a leader extending through said eye and connected to said shank, said leader extending over and engaging the outer periphery of said washers.

2. A device as claimed in claim 1 and further including bait mounted on the hook and said bait having a portion thereof positioned between the washers.

3. A device as claimed in claim 2 wherein the bait consists of a worm having it's head portion mounted in engagement with the tip of the hook and it's tail portion interposed between said washers.

4. A device as claimed in claim 3 wherein the bait consists of a minnow like member having a head portion engaging the tip of the hook and a tail portion interposed between said pair of washers.

5. A device as claimed in claim 4 wherein the pair of washers are interposed between the eye of the fish hook and the point of securement of the leader to the fish hook shank.

6. A device as claimed in claim 5 wherein the pair of washers are moveably mounted on the fish hook shank and said washers are mounted for movement towards and away from each other.

* * * * *